(12) United States Patent
Klose et al.

(10) Patent No.: US 8,759,745 B2
(45) Date of Patent: Jun. 24, 2014

(54) DEVICE FOR THE REPRODUCIBLE ADJUSTMENT OF A PIN HOLE OPENING AND PIN HOLE POSITION IN LASER SCANNING MICROSCOPES USING A REFLECTOR

(75) Inventors: Heinrich Klose, Jena (DE); Karlheinz Bartzke, Jena (DE); Juergen Heise, Jena (DE); Ralf Wolleschensky, Jena (DE); Matthias Burkhardt, Eichenberg (DE)

(73) Assignee: Carl Zeiss Microscopy GmbH, Jena (DE)

( * ) Notice: Subject to any disclaimer, the term of this patent is extended or adjusted under 35 U.S.C. 154(b) by 1147 days.

(21) Appl. No.: 11/919,895

(22) PCT Filed: Apr. 29, 2006

(86) PCT No.: PCT/EP2006/004045
§ 371 (c)(1),
(2), (4) Date: Apr. 1, 2009

(87) PCT Pub. No.: WO2006/117172
PCT Pub. Date: Nov. 9, 2006

(65) Prior Publication Data
US 2009/0303583 A1 Dec. 10, 2009

(30) Foreign Application Priority Data
May 3, 2005 (DE) .......................... 10 2005 020 542

(51) Int. Cl.
*G01D 5/34* (2006.01)
*H01J 3/14* (2006.01)

(52) U.S. Cl.
USPC .......................................... 250/229; 250/216

(58) Field of Classification Search
USPC ........ 250/201.1, 201.9, 208.1, 216, 229, 306, 250/307; 359/368, 385, 381, 382, 383; 356/121, 122, 124.5, 124, 125, 126, 356/127, 123, 609, 624, 399–401
See application file for complete search history.

(56) References Cited

U.S. PATENT DOCUMENTS

| | | | | |
|---|---|---|---|---|
| 3,705,755 A * | 12/1972 | Baer | .......................... | 359/202.1 |
| 3,740,147 A * | 6/1973 | Kallet | ........................... | 356/328 |
| 4,097,743 A * | 6/1978 | Carlson | ...................... | 250/339.1 |
| 4,163,150 A * | 7/1979 | Stankewitz | ................... | 250/205 |
| 4,958,920 A * | 9/1990 | Jorgens et al. | ................ | 359/392 |
| 5,084,612 A * | 1/1992 | Iwasaki et al. | ................ | 250/216 |
| 5,241,364 A * | 8/1993 | Kimura | ......................... | 356/491 |
| 5,706,091 A * | 1/1998 | Shiraishi | ...................... | 356/399 |
| 5,874,726 A * | 2/1999 | Haydon | ....................... | 250/201.1 |

(Continued)

FOREIGN PATENT DOCUMENTS

| | | | | |
|---|---|---|---|---|
| DE | 103 23 921 A1 | 12/2004 | | |
| JP | 61140914 A * | 6/1986 | ............. | G02B 21/00 |

(Continued)

*Primary Examiner* — Que T Le
*Assistant Examiner* — Jennifer Bennett
(74) *Attorney, Agent, or Firm* — Patterson Thuente Pedersen, P.A.

(57) ABSTRACT

Device to adjust the position and/or size of a pinhole in a laser scanning microscope (LSM) where the pinhole is illuminated via a separate light source or the LSM laser and the pinhole is moved at a right angle to the optical axis until the receiver has the maximum intensity and the pinhole position is captured and saved together with the data attributed to the replaceable optical components.

4 Claims, 11 Drawing Sheets

Figure 1:
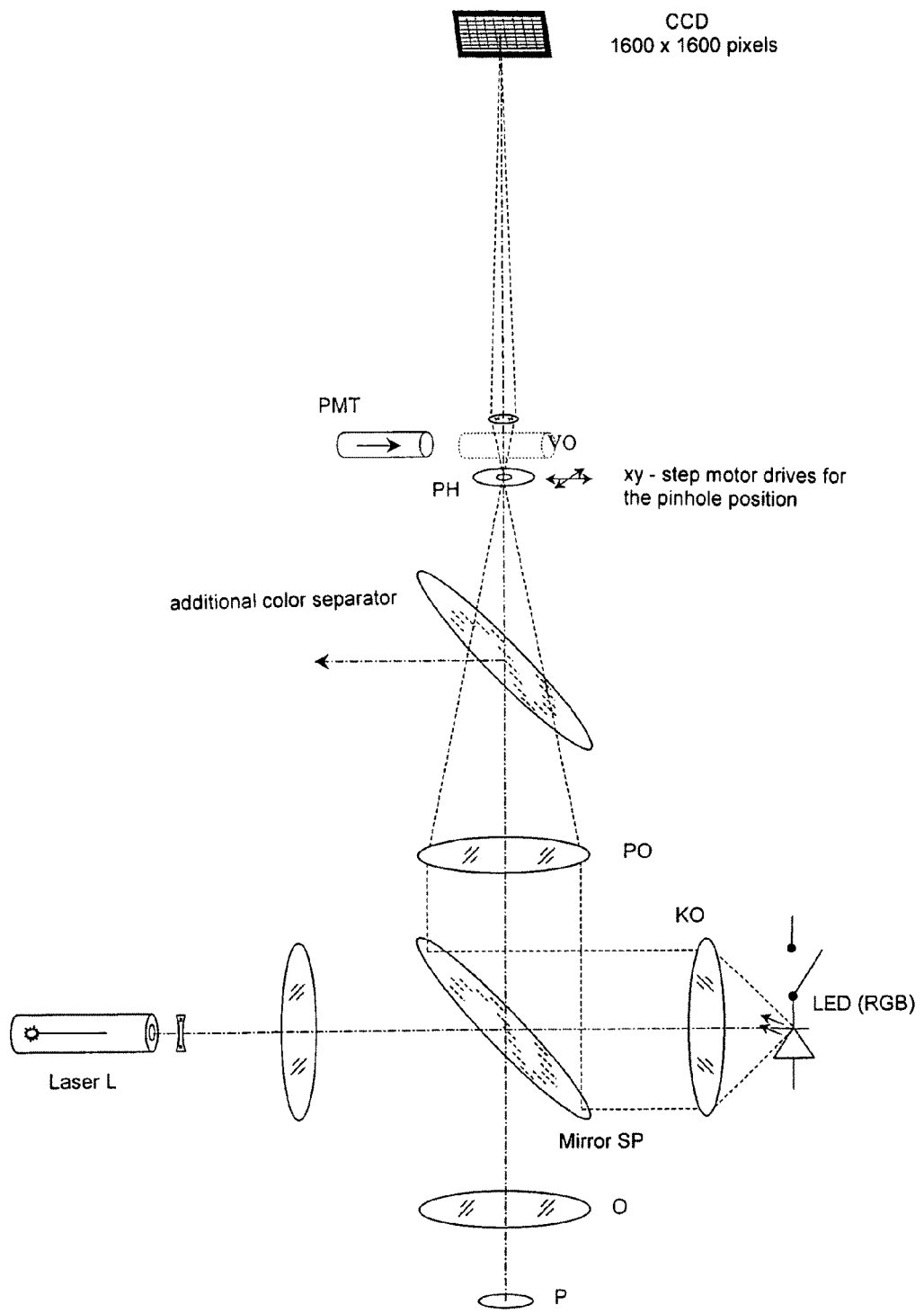

Laser scanning microscope with retro film that can be inserted into the optical path to adjust the pinhole to the waist of the laser focus

(56) References Cited

U.S. PATENT DOCUMENTS

| | | | |
|---|---|---|---|
| 5,932,871 A * | 8/1999 | Nakagawa et al. | 250/201.3 |
| 6,167,173 A * | 12/2000 | Schoeppe et al. | 385/33 |
| 6,185,035 B1 | 2/2001 | Otsuki et al. | |
| 6,269,206 B1 * | 7/2001 | Simon et al. | 385/31 |
| 6,449,087 B2 * | 9/2002 | Ogino | 359/383 |
| 6,563,632 B1 | 5/2003 | Schoeppe et al. | |
| 6,617,590 B2 * | 9/2003 | Nishioka et al. | 250/459.1 |
| 6,633,375 B1 * | 10/2003 | Veith et al. | 356/237.4 |
| 7,209,287 B2 * | 4/2007 | Lauer | 359/368 |
| 8,345,234 B2 * | 1/2013 | Myrick et al. | 356/300 |
| 2002/0033953 A1 * | 3/2002 | Hill | 356/516 |
| 2002/0036824 A1 * | 3/2002 | Sasaki | 359/385 |
| 2003/0151741 A1 * | 8/2003 | Wolleschensky et al. | 356/317 |

FOREIGN PATENT DOCUMENTS

| | | |
|---|---|---|
| JP | 2002-277746 | 9/2002 |
| WO | WO 2004/104522 A1 | 12/2004 |
| WO | WO 2004/104647 A1 | 12/2004 |

* cited by examiner

Laser scanning microscope with CCD and LED to mark the position of and for the reproducil setting of the pinhole opening (front illumination of pinhole)

Laser scanning microscope with CCD and LED to mark the position of and for the reproducible setting of the pinhole opening (back illumination of pinhole)

Laser scanning microscope with CCD and ring mirror to mark the position of and for the reproducible setting of the pinhole opening

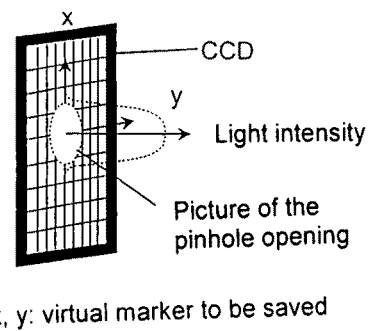
Figure 4: Position determination of the pinhole opening
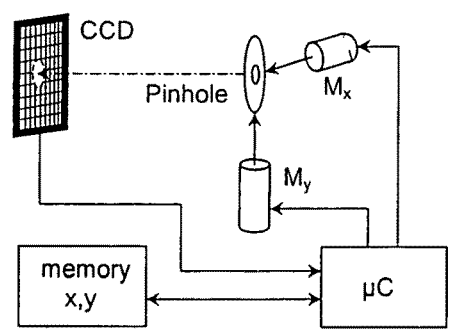
Figure 5: Position control of the pinhole opening Layout of the invention with back illumination of 4 pinholes via 1 LED each and 1 condenser each and CCD evaluation camera for the LSM 510 as per Figure 2

Laser scanning microscope with axial light marker for the reproducible adjustment of the pinhole position Laser scanning microscope with reference pinhole and angled light marker for the reproducible adjustment of the pinhole position Laser scanning microscope with diaphragm for the reproducible adjustment of the pinhole position Laser scanning microscope with quadruple element for the reproducible adjustment of the pinhole position (only 2 optical paths shown)

Laser scanning microscope with retro film that can be inserted into the optical path to adjust the pinhole to the waist of the laser focus Laser scanning microscope with a triple prism that can be inserted into the optical path to adjust the pinholes to the waist of the laser focuses

DEVICE FOR THE REPRODUCIBLE ADJUSTMENT OF A PIN HOLE OPENING AND PIN HOLE POSITION IN LASER SCANNING MICROSCOPES USING A REFLECTOR

RELATED APPLICATIONS

The present application is a National Phase entry of PCT Application No. PCT/EP2006/004045, filed Apr. 29, 2006, which claims priority from German Application Number 10 2005 020 542.9, filed Feb. 1, 2005, the disclosures of which are hereby incorporated by reference herein in their entirety.

FIELD OF THE INVENTION

The invention involves the exact marking of significant positions of the pinhole opening by virtual XY markers.

BACKGROUND OF THE INVENTION

A pinhole for the laser scanning microscopy has already been suggested (DE10323921), which shall allow the setting of the pinhole size beginning at 2 µm and the setting of the pinhole position at a reproducibility of 2 µm. This should result in an improvement of the pinhole setting values compared to currently used LSM pinholes by the factor of 5. The reproducibility error of 2 µm is caused by the described step motor spindle drive and the referencing procedure of this patent. The resolution of the step motor drive is 0.3 µm (differential thread with 50 µm pitch and step motor running in ⅛ micro step operation).

A pinhole with a size of 2 µm can be used sensibly if the pinhole position can be set for a reproducibility of approx. 0.5 µm.

If the setting of the pinhole location only has a reproducibility error of 2 µm, the light hitting the small pinhole opening can be vignetted considerably.

Therefore, the invention is based on the task of improving the reproducibility of the pinhole position to an advantageous 0.5 µm.

In order to be able to achieve reproducibility of the linear movement of 0.5 µm by regular spindle drives high resolution position measuring systems are generally needed which are, however, too expensive and whose dimensions are too large for pinhole setup. Therefore, a solution is sought which will allow achieving a setting of the pinhole position reproducible to 0.5 µm without measuring systems.

SUMMARY OF THE INVENTION

The invention involves the exact marking of significant positions of the pinhole opening by virtual XY pointers.

The determination of the virtual pointers can be achieved by using a CCD camera mounted to the laser scanning microscope. The virtual pointer, referring to a coordinate system, which may have a zero point for an x and y axis in the corner of a CCD chip, is stored in an electronic memory and serves to be able to find each marked pinhole position at any time and as often as desired with a reproducibility of 0.5 µm. For this, step motor drives with a resolution of 0.3 µm are operated in a closed loop which compares the current position of the pinhole opening with the virtual pointer and corrects the variances. The suggested solution also involves imaging the optically enlarged pinhole opening onto a high resolution chip of a CCD camera to determine the position and size of the pinhole opening by image evaluation, to compare the current values to the saved original position and original size of the pinhole, and to correct variances by a high resolution step motor control to a residual variance of 0.5 µm.

A further solution is to create one or more light pointers analog to the laser beam focused on the pinhole and to capture them from the pinhole using the step motor drives and the photomultiplier or a light detector.

Then, the pinhole opening will be located in a position of maximum light intensity of the light marker and therefore also of the laser focus.

As the photomultiplier or light detector is a surface detector without local resolution, this solution does not include the determination and control of the size of the pinhole opening. This is, however, not a major disadvantage, as the reproducible setting of small pinhole openings of sizes of 2 µm to 0.5 µm are ensured by a referencing procedure (referencing takes place when the pinhole first opens and the light hits the photomultiplier detector) and the reproducible setting of large pinhole sizes of 50 µm to 1000 µm by a high resolution step motor drive.

A significant advantage of the solutions with additional light sources is that the sample P does not need to be exposed to any light stress during the pinhole adjustment, as the laser L can be switched off.

1. SETUP AND PROCEDURE ACCORDING TO THE INVENTION

Figure 2:
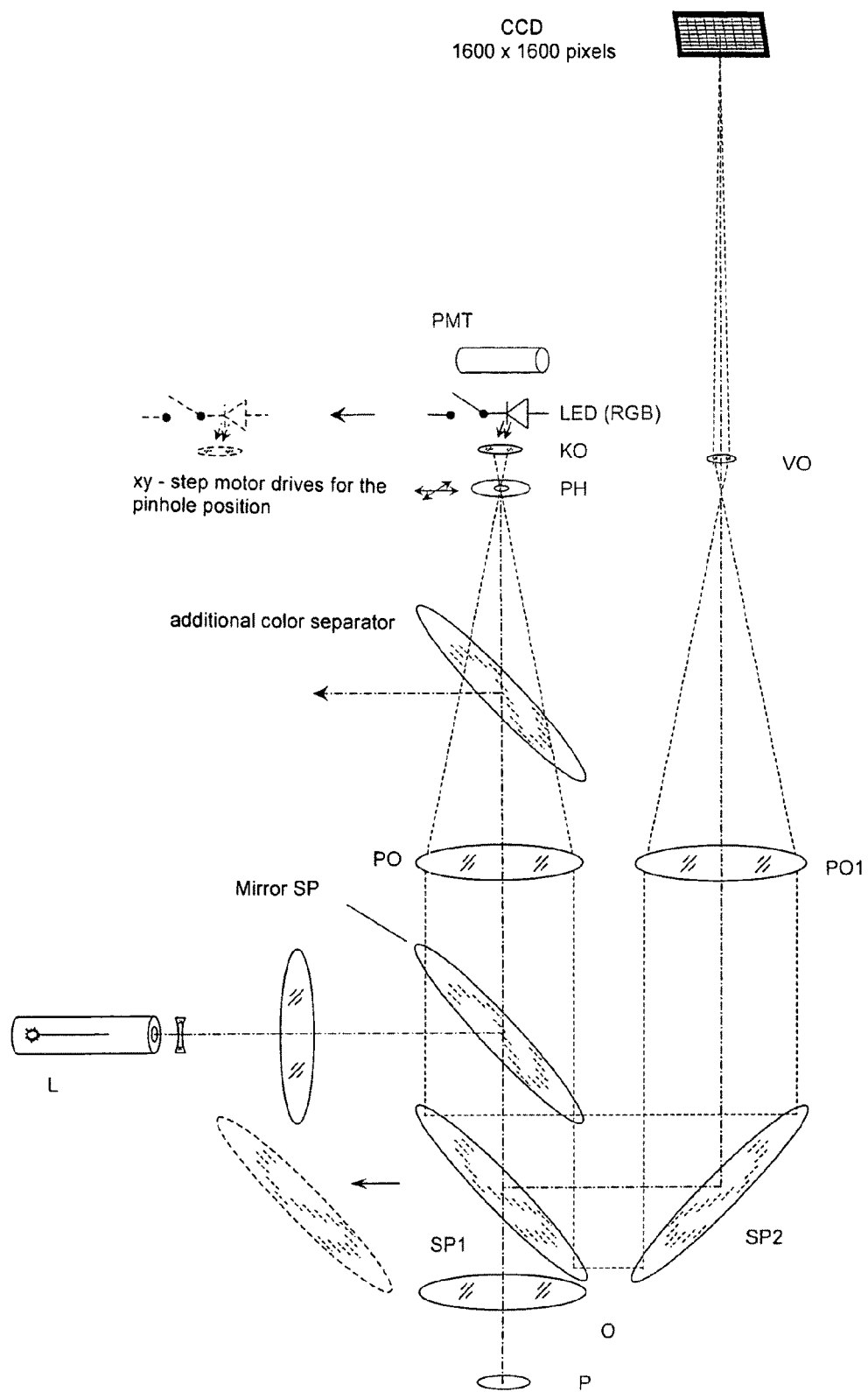
Figure 3:
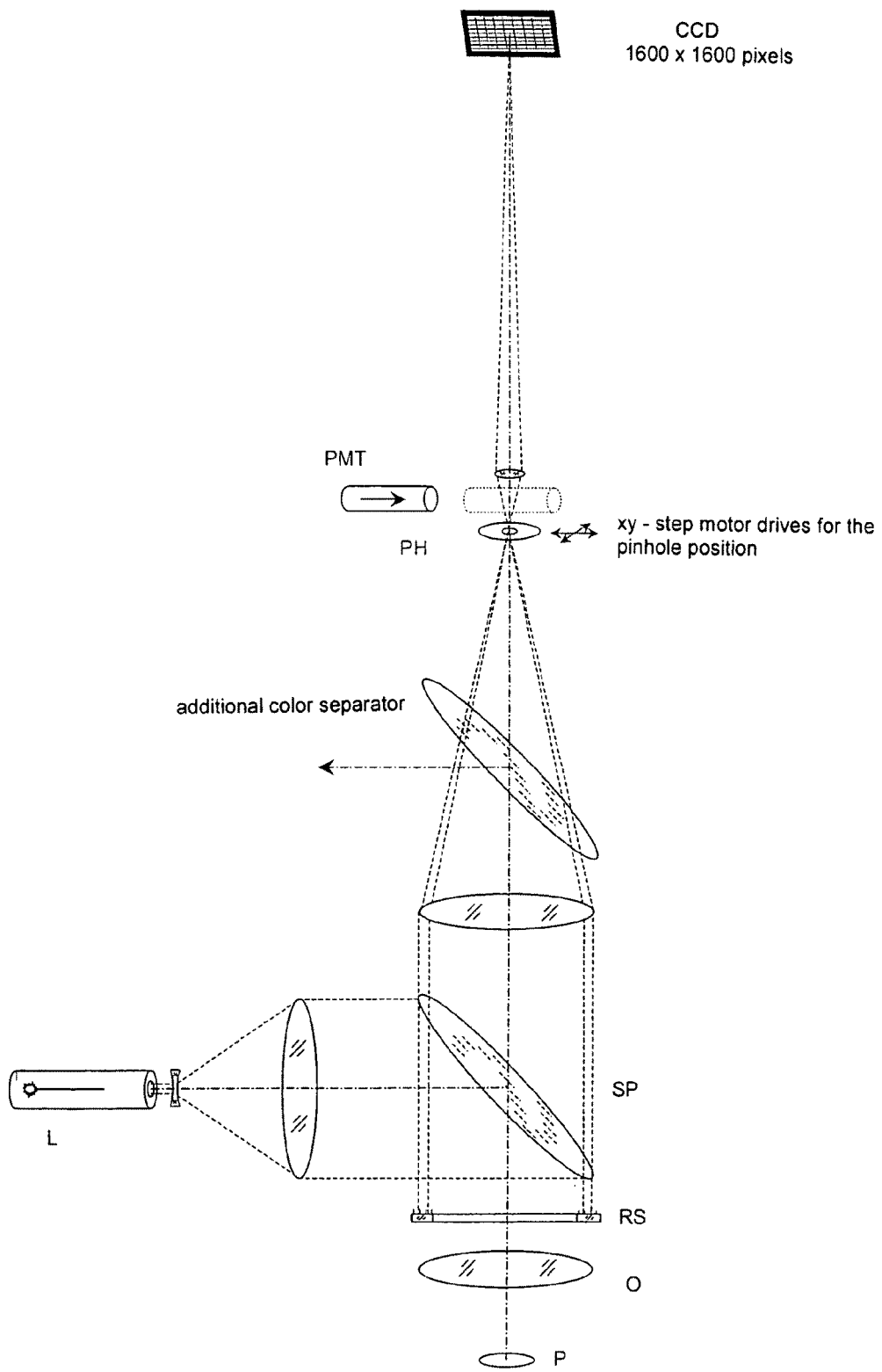

Optical Layout (FIGS. 1, 2 and 3)

For the marking process, the pinhole is imaged on an approx. 10×10 mm$^2$ surface of the CCD chip with a tenfold magnification rate of VO optics.

A PC or a µm controller calculates the optical focus of the pinhole opening on the CCD detector surface whose XY coordinates are saved as a virtual vector.

For example, the left bottom corner of the CCD surface could be used as a zero point of the XY coordinate system. A suitable illumination of the pinhole opening must be realized for the marking process. An advantageous illumination is achieved by a white light LED, which may consist of three colored diodes (red, green, blue), so that an illumination independent of the type dichroitic mirror used is warranted. Another advantageous choice for the marking process would be an IR LED (900 µm). The dichroitic mirrors and filters should be IR-permeable. All optical layout examples described in the following, with CCD detectors do not influence the laser scanning process and therefore do not cause a loss of light emitted from the sample.

For each pivoted dichroitic splitting mirror or other exchangeable optical components, the optimal pinhole position is captured once and saved, and then recreated when the respective module is pivoted during the normal LSM operation.

The optimal pinhole position is determined by the intensity measurement on the PMT during the marking process.

Front Illumination of the Pinhole Opening via an LED (FIG. 1)

A laser scanning microscope is shown as a diagram with an illumination laser illuminating a sample P, a lens O, a pinhole optical system PO, a pinhole adjustable perpendicular to the optical axis PH, followed by a photomultiplier PMT, and a dichroitic mirror SP to separate the exciting and detection optical paths. A side color separator allows the simultaneous observation of the second wavelength of the fluorescent light.

An LED or halogen lamp mounted in an additional optical arm of the laser scanning microscope illuminates the pinhole opening from the front via a collimator KO and the dichroitic mirror SP.

For space reasons, the photomultiplier PMT is pivoted away from the optical path of the laser scanning microscope during the marking process and a magnifying optical system VO and a CCD chip is positioned behind the pinhole PH. The LED is then switched off during the laser scanning process.

Back Illumination of the Pinhole Opening via an LED (FIG. 2)

An LED or halogen lamp positioned between the photomultiplier PMT and the pinhole PH illuminates the pinhole PH via a condenser KO, also in three colors or by IR. The pinhole opening is imaged onto the CCD by means of at least one additional mirror SP1 (here, there are two mirrors SP1 and SP2) via an optical arm mounted in the laser scanning microscope (optical system PO1 and VO). The additional mirror(s) installed in the optical path of the laser scanning microscope can be swiveled out for the laser scanning process and swiveled in for the marking process. During the laser scanning process, the LED is switched off and swiveled out of the optical path. The photomultiplier does not need to be swiveled out. For the setup of the pinhole position as per FIGS. 1 and 2, a laser and CCD can be used instead of the LED, but by stressing the sample.

The advantage of this arrangement lies in the errors of the dichroitic during the marking process.

Illumination of the Detector Pinhole by the Laser and a Ring Mirror (FIG. 3)

The illumination of the pinhole is done from the front by the laser and a ring mirror placed in the telecentric optical path of the laser scanning microscope, here between lens O and mirror SP, which reflects the laser light in the direction of the pinhole PH in an uncoated margin area of the dichroitic mirror SP. The photomultiplier is swiveled out of the optical path of the laser scanning microscope during the marking process. The ring mirror RS does not need to be swiveled out of the optical path during the laser scanning process as the laser light is blocked by pivotable filters (not shown) and thus cannot reach the photomultiplier.

Also, with this arrangement the errors of the dichroitic mirror are also during the marking process.

Position Marking and Control of the Pinhole Opening (FIGS. 4 and 5)

A PC or a micro-controller evaluates the CCD signals, determines the optical focus of the pinhole opening and saves the XY coordinates of the pinhole opening positions to be marked. The pixel size of the of the CCD is approx. 6 µm. Due to the present tenfold magnification of the CCD camera, the reproducibility requirement is reduced from 0.5 µm to 5 µm.

Also, the size of the pinhole opening can be determined and controlled by means of this procedure. Instead of the focus point of the pinhole opening, the position of the pinhole edges imaged on the CCD chip is evaluated.

The pinhole opening is shown as a circle in this diagram. If it is square or rectangular the respective edge position can easily be determined on the CCD.

In order to be able to find a marked position of the pinhole opening reproducibly again the laser scanning microscope is adjusted just like with the marking of the pinhole position (LED or mirror swiveled in, photomultiplier possibly swiveled out). The micro-controller controls the two step motor drives $M_x$ and $M_y$, so that the current position of the pinhole opening on the CCD chip has the same XY coordinates as the saved virtual marker. The pinhole opening is now located at the point marked on the CCD chip with a variance of max. 0.5 µm.

Parallel to this procedure, the size of the pinhole opening can also be determined and adjusted with a reproducibility of 0.5 µm.

Using the arrangement and procedure according to this invention, the opening and position of the pinhole can be determined and adjusted as often as desired and at any location with a reproducibility of 0.5 µm. However, the typically used CCD must not be subjected to long-term position changes in reference to the optical path of the laser scanning microscope.

Figure 6:
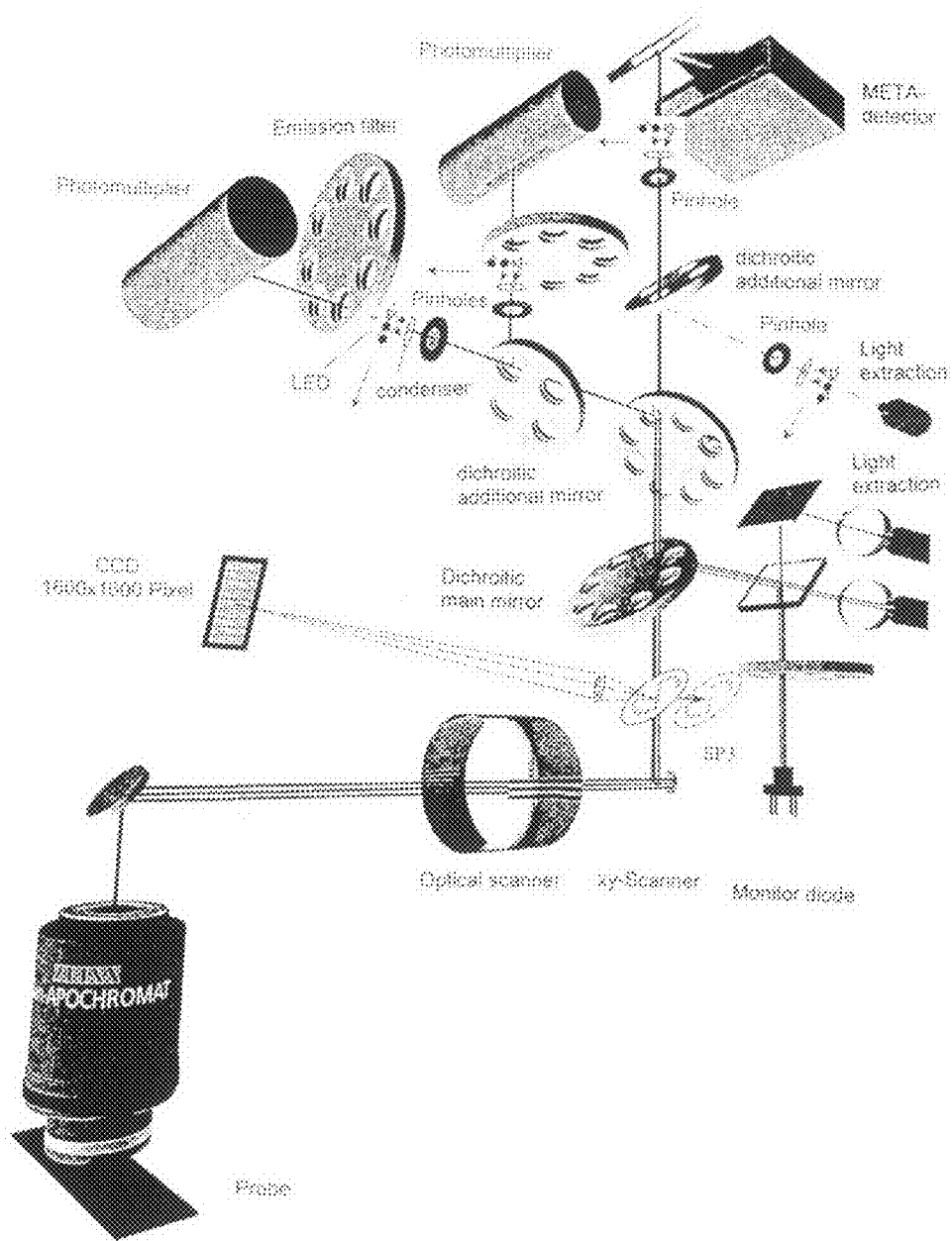

Design Example LSM (FIG. 6)

FIG. 6 depicts a design example of the layout of FIG. 2 according to this invention for a ZEISS LSM 510. The four pinholes are illuminated from behind by a swiveled in and serially switched on LED and one condenser each. An additional mirror SP3, which can be precisely swiveled in, redirects the light coming from the pinhole to the CCD chip whose signals are evaluated. An advantage is that only one CCD camera is required on the laser scanning microscope to mark and set up all four pinholes and that the marking errors caused by the dichroitic main mirror are also detected.

FIGS. 7, 8, 9 and 10 show solution variants for another advantageous adjustment procedure for the pinhole position.

Figure 7:
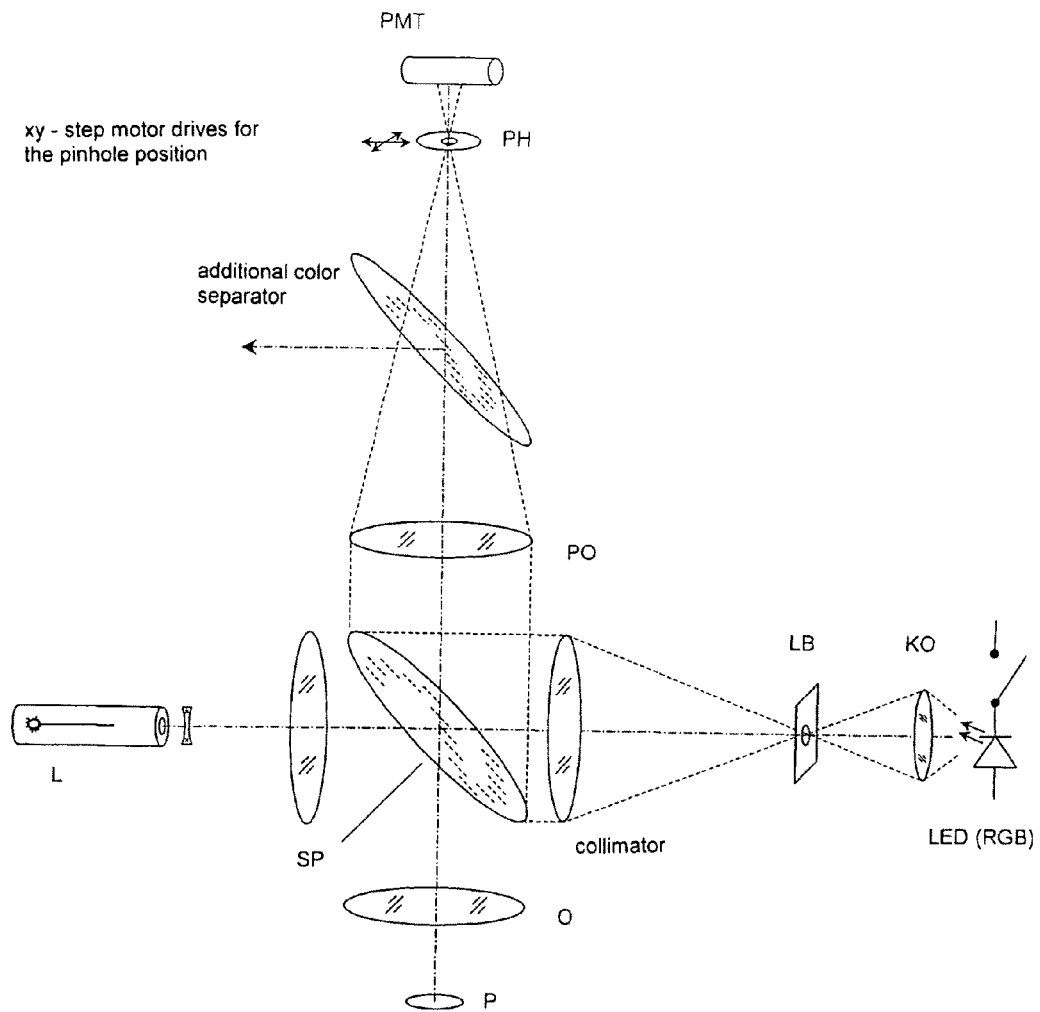

In FIG. 7, an axial light marker, which is supposed to have the same position as the laser beam, is created by additional optical elements.

The pinhole's position is controlled by the step motors so that the photomultiplier detects a maximum light signal. Then, the light marker will precisely hit the pinhole opening. The pinhole position is therefore optimally adjusted for the laser scanning process.

An aperture LB illuminated by the LED is imaged in the pinhole plane. The image of the aperture is used as an optical pointer which is detected via the pinhole, by the photomultiplier, adjusted by the step motor drives.

The initial calibration of the pinhole positions and storing of the X and Y coordinates take place via search algorithms with the laser. The aperture is adjusted so that the LED focus corresponds to the laser focus.

Following calibration, the measurement with the LSM adjusts the pinhole positions by means of the stored pinhole positions. A subsequent fine tuning takes place after the LED focus where it is advisable not to burden the sample laser with light as the laser will be switched off.

Figure 8:
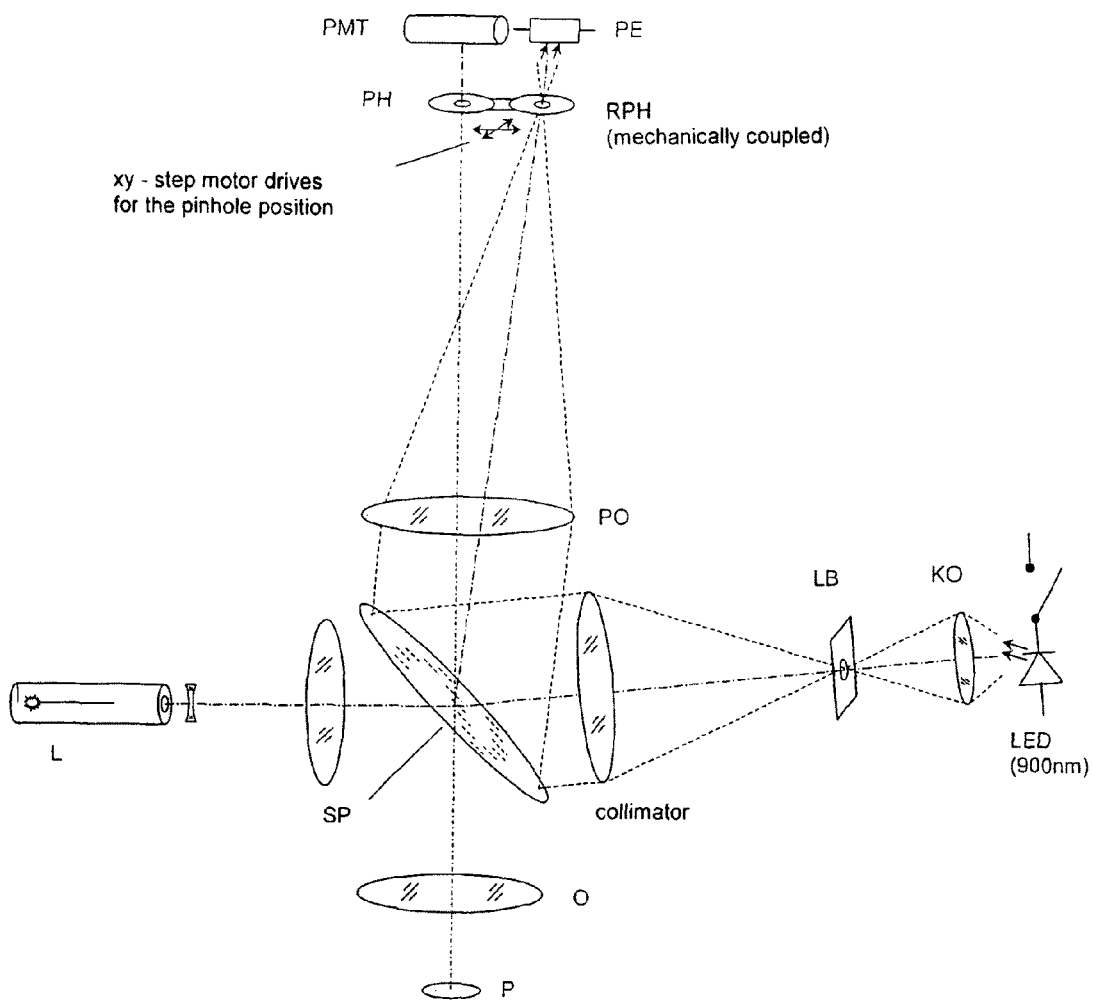

In FIG. 8, a light pointer is created at an angle to the laser beam which hits an additional reference pinhole RPH.

This angular positioning is adjusted during the initial calibration of the LSM, by adjusting the pinhole to the laser focus via search algorithms. After that, the aperture is adjusted so that the LED focus shines through the reference pinhole and the photo detector PE located behind it will show maximum intensity.

After the calibration, the LSM will be used to measure the pinhole positions by means of the stored pinhole positions and fine corrections (tuning) with the laser focus as shown in FIG. 7. An LED featuring a wavelength of 900 µm is recommended for the reference pinhole.

As the PMT is insensitive with this wavelength, the control of the pinhole position can take place with the IR LED at a high quantum efficiency at the photo detector prior to or even during the measurements taken with the LSM.

The adjustment of the pinhole position takes place via the reference pinhole. The pinhole and the reference pinhole are mechanically coupled. It is recommended to use a separate photo detector PE as a detector instead of a photomultiplier.

The aperture is shown in the plane of the reference pinhole. The PMT and the laser are not needed for this adjustment.

Figure 9:
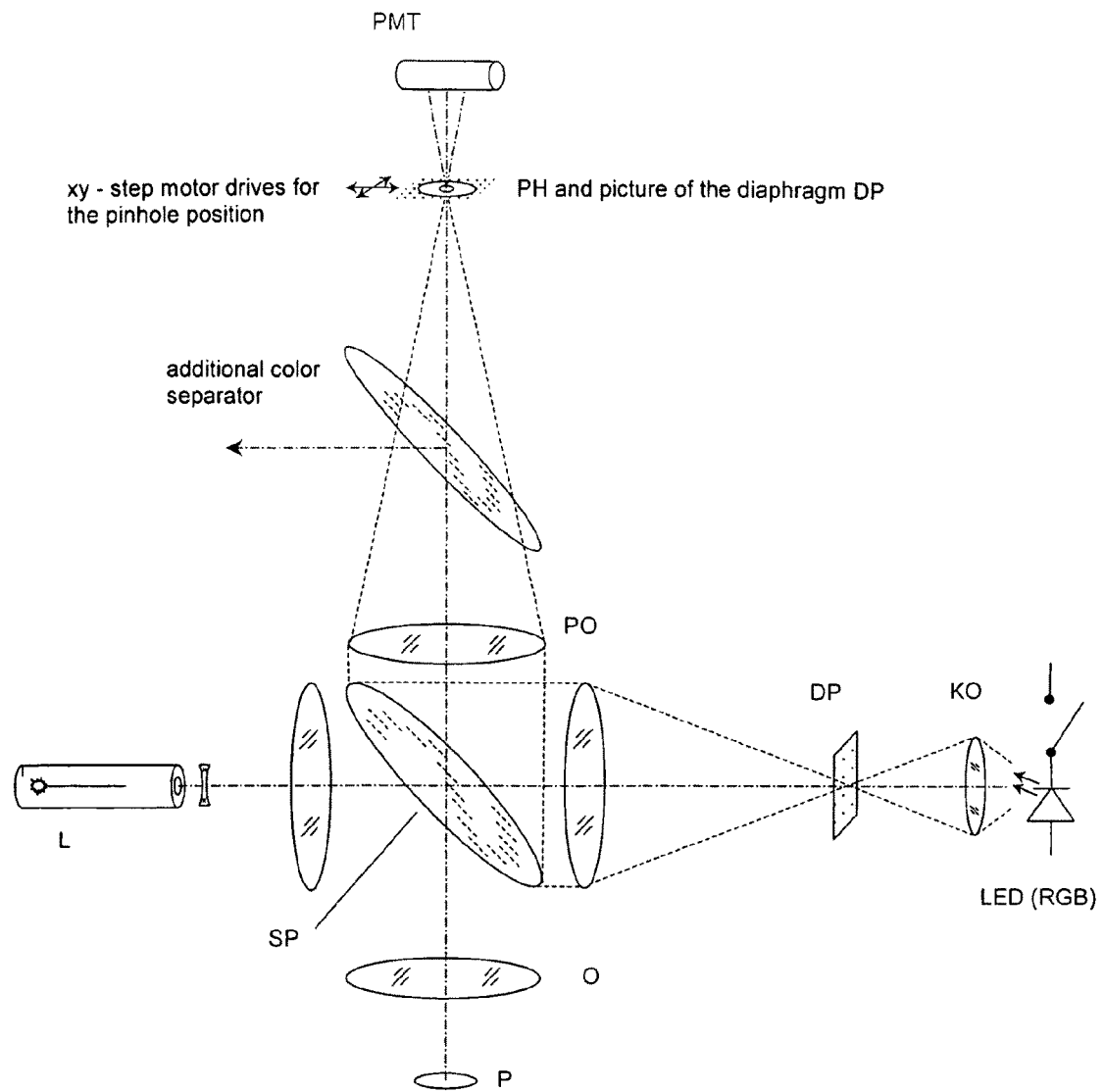

In FIG. 9, a surface scale consisting of $100 \times 100 = 10^4$ light pointers in the pinhole adjustment range of $1 \times 1$ mm is created via the optical image of a diaphragm DP into the pinhole plane. The pinhole and photomultiplier can detect every light pointer with high reproducibility via the high resolution step motor drives, then they can set up random pinhole positions in a square measuring $10 \times 10$ μm. The diaphragm is a chrome mask or a cross grid measuring $1 \times 1$ mm perforated with a matrix of holes (5 μm diameters, 10 μm spaces).

The position of the diaphragm foci in the pinhole plane is determined by the initial calibration of the LSM by search algorithms by adjusting the diaphragm so that the laser focus, as well as the focus of the diaphragm (e.g. the center one), exits through the pinhole (coordinate origin). All other pinhole positions refer to this coordinate origin and the other optical pixels of the focus matrix are defined and stored.

When measuring with the LSM, the pinhole position is adjusted by setting it to the stored diaphragm focus and motor-driven interpolation between the foci. The laser should be kept switched off during this procedure.

Instead of the diaphragm in FIG. 9, a micro lens array can also be used. Micro lenses with a diameter of 50 μm are commonly used. An array measuring $5 \times 5$ mm would then also create $100 \times 100 = 10^4$ light pointers which, however, must be imaged into the pinhole plane optically reduced by 1:10.

Figure 10:
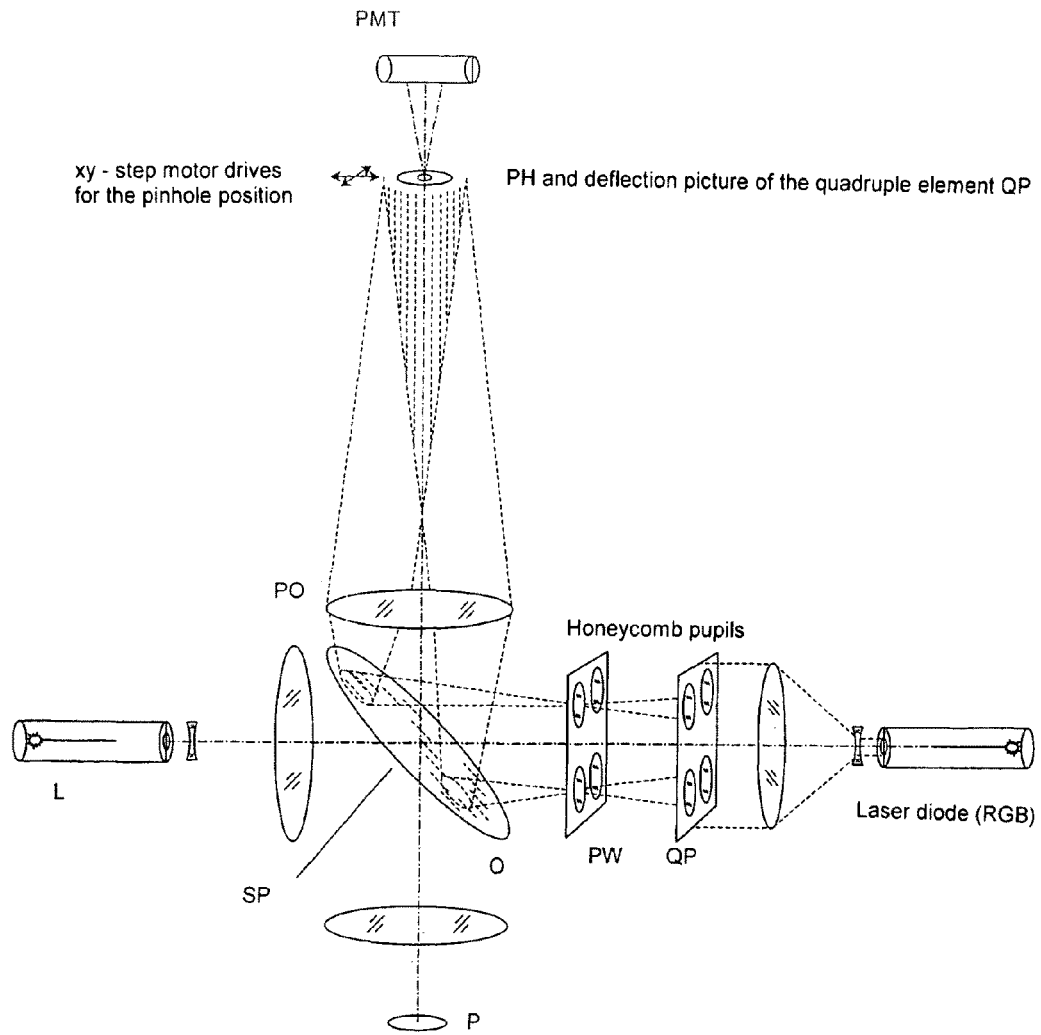

In FIG. 10, the deflected image of a quadruple element QP consisting of micro lenses is created in the pinhole plane which also represents a matrix of optical pointers. A honeycomb pupil PW prevents disturbing Fresnel deflection.

Principle: The quadruple element consists of 4 micro lenses containing the honeycomb pupils in their centers to prevent the Fresnel deflection.

The deflection image of the quadruple element in the pinhole plane is a matrix of optical pointers, which serves as an area scale. The pinhole can be adjusted reproducibly to every desired optical pointer via the high resolution step motor drives and the photomultiplier.

Using the Parameters f=150 mm focal length of the imaging lens L d=10 mm distance between the micro lenses of the quadruple element λ=630 nm wave length of red laser diode and the deflection equation $$g = \lambda \cdot f/d$$

will result in the distance of the matrix-shaped light pointers in the pinhole plane of g=9.5 μm.

Pinhole and photomultiplier can capture every light pointer with high reproducibility via the high resolution step motor drives and insert any number of pinhole positions into a square measuring $9.5 \times 9.5$ μm.

Figure 11:
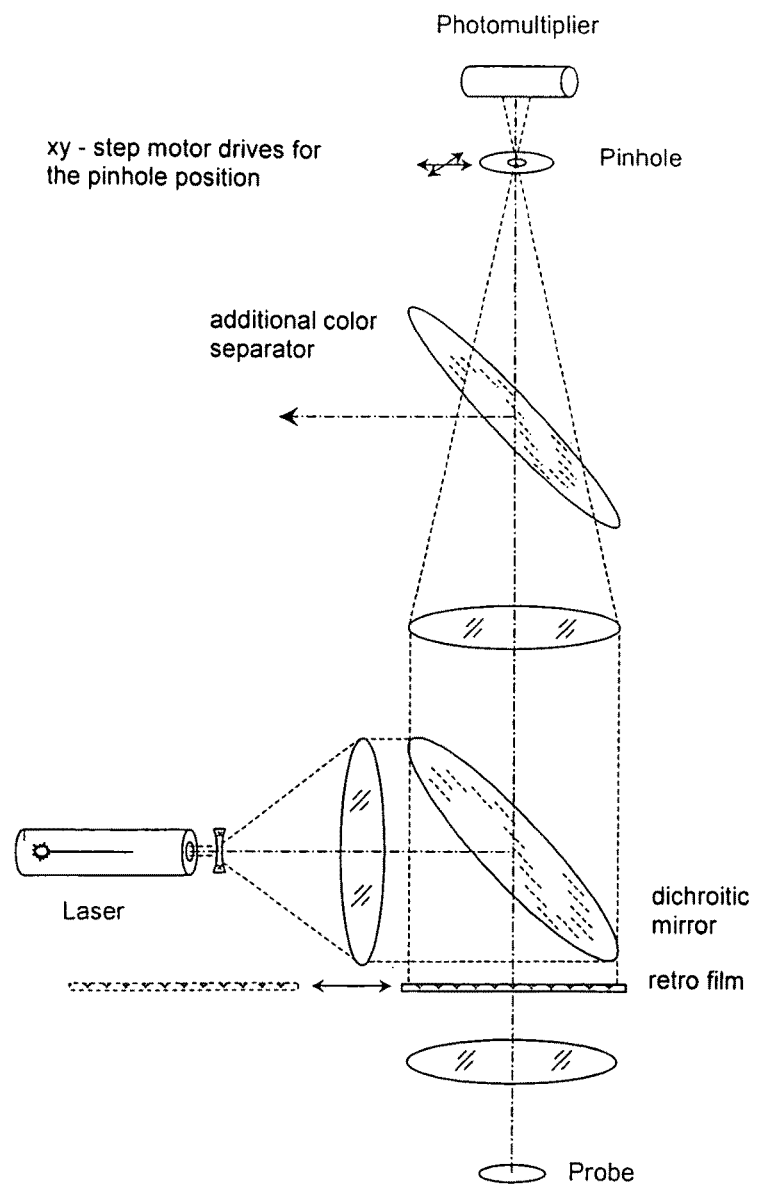
Figure 12:
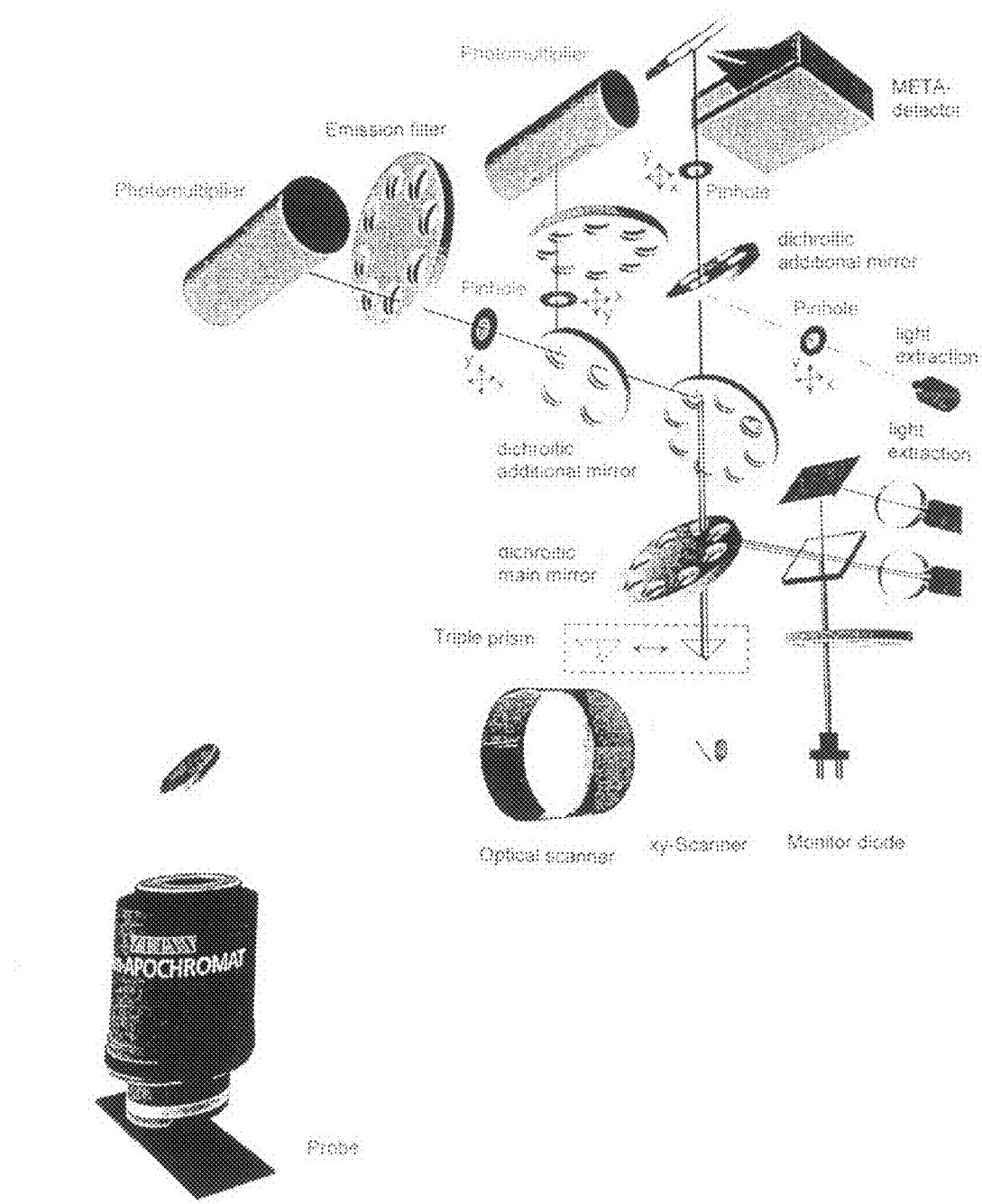

Another especially easy procedure to adjust pinholes should be added. The suggestion is to add a retro film (FIG. 11) or a triple prism (FIG. 12) to the parallel optical path of the laser scanning microscope and to be able to slide it in and out of the optical path. This optical element being pushed into the optical path will result in the laser focus being imaged in the pinhole plane and it will prevent the sample from being stressed and faded by the laser light during the adjustment. If the optical element is withdrawn from the optical path, the sample is available for observation. There are no special requirements for this sliding mechanism due to the angular variance of retro film or triple prisms. The only minimally open pinhole opening can now be adjusted so that the laser light penetrates it exactly and is received optimally by the photo detector.

The photo detector will not be over-exposed due to the very small opening in the pinhole. A motor-driven presetting of the pinhole opening close to the laser focus (max. 2 μm offset), whose values can be found in a one-time adjustment procedure, facilitates the automatic search for the focus via small scanning movements of the XY drives of the pinhole system in an area of about 5 μm×5 μm.

1. Advantages

The pinhole opening can be adjusted to better than 0.3 μm to the laser focus following this procedure.

The pinhole adjustment can also be performed during a sample examination, as the sample does not get stressed by the laser due to the inserted optical elements (retro film or triple prism) and cannot be faded.

The small pinhole openings (of e.g. 0.3 μm) can also be adjusted to exactly 0.3 μm, even without position measuring systems.

2. Notes

In order to have the full intensity of the laser light available for this adjustment at the pinhole, there should not be any color filters present in the optical path.

Another invention suggestion describes how angle errors of the laser beam can be avoided when switching the separator mirrors and color filters (3-point mirror system).

This procedure is similar to the ring mirror procedure in FIG. 3, where the sample is stressed by laser light during the adjustment process, and which assumes an exact alignment of the ring mirror perpendicular to the optical axis.

The invention claimed is:

1. A laser scanning microscope (LSM) having an LSM laser, comprising:

an adjustment device that adjusts a position and/or a size of a pinhole in the laser scanning microscope;

the adjustment device comprising:

a light sensitive receiver that receives light that passes through the pinhole; and a pinhole drive;

wherein the pinhole is illuminated by the LSM laser and the pinhole is moved substantially at a right angle to an optical axis of the pinhole by the pinhole drive until a maximum illumination intensity is achieved on the light sensitive receiver; and further wherein illumination from the LSM laser is focused substantially in a plane of the pinhole and is directed to the pinhole by a reflector that intercepts light that would otherwise be directed to a sample and reflects light away from the sample toward the adjustment device.

2. The laser scanning microscope as in claim 1, further comprising a ring mirror located to reflect part of the illumination light in the direction of the pinhole.

3. The laser scanning microscope as in claim 1, wherein the reflector further comprises a retro film that can be interposed into the optical path.

4. The laser scanning microscope as in claim 1, wherein the reflector further comprises a triple prism that can be interposed into the optical path.

\* \* \* \* \*